（12）United States Patent
Shan

(10) Patent No.: US 12,521,920 B2
(45) Date of Patent: Jan. 13, 2026

(54) METHOD FOR GENERATING MICROSTRUCTURE ON A FILM BY A ROLLER

(71) Applicant: Essilor International, Charenton-le-pont (FR)

(72) Inventor: Haifeng Shan, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 254 days.

(21) Appl. No.: 17/918,037

(22) PCT Filed: Apr. 12, 2021

(86) PCT No.: PCT/EP2021/059442
§ 371 (c)(1),
(2) Date: Oct. 10, 2022

(87) PCT Pub. No.: WO2021/209387
PCT Pub. Date: Oct. 21, 2021

(65) Prior Publication Data
US 2023/0127265 A1    Apr. 27, 2023

(30) Foreign Application Priority Data
Apr. 14, 2020 (EP) ..................... 20315170

(51) Int. Cl.
*B29C 43/46*    (2006.01)
*B29C 33/38*    (2006.01)
*B29C 43/24*    (2006.01)

(52) U.S. Cl.
CPC .......... *B29C 43/46* (2013.01); *B29C 33/3835* (2013.01); *B29C 43/24* (2013.01); *B29C 2043/463* (2013.01)

(58) Field of Classification Search
CPC ..... B29C 43/46; B29C 33/3835; B29C 43/24; B29C 2043/463
(Continued)

(56) References Cited

U.S. PATENT DOCUMENTS 3,768,946 A * 10/1973 Matuschke ............. B29C 59/04
425/363
5,507,806 A * 4/1996 Blake .................... A61F 2/1618
264/2.7
(Continued)

FOREIGN PATENT DOCUMENTS

WO    WO-2021209387 A1 * 10/2021 ......... B29C 33/3835

OTHER PUBLICATIONS

Zhang et al., ("Rotating-tool diamond turning of Fresnel lenses on a roller mold for manufacturing of functional optical film", Precision Engineering 51 (2018) 445-457) (Year: 2018).*

(Continued)

*Primary Examiner* — Iftekhar A Khan
(74) *Attorney, Agent, or Firm* — Norton Rose Fulbright US LLP

(57) ABSTRACT

The present disclosure relates to a method of designing a spherical microstructure mold (604-614) module to be incorporated into a calendering roller (600) for generating a microstructure (108) on a planar surface (104), comprising calculating a first curvature (204) on a cross-sectional planar surface (202) for a first microstructure point of the spherical microstructure mold module, calculating a second curvature (210) of a spherical surface (102) of the spherical microstructure mold module, measuring a radius (214) of the spherical surface (102), the radius (214) being from the center of the spherical surface (102) to the first microstructure point, and determining a location of the microstructure (108) on the planar surface (104), the location being derived (Continued)

600 from the first curvature (204), the second curvature (210), and the radius (214).

7 Claims, 9 Drawing Sheets

(58) Field of Classification Search
USPC ............................................................. 703/1
See application file for complete search history.

(56) References Cited

U.S. PATENT DOCUMENTS

| | | | | |
|---|---|---|---|---|
| 7,891,856 B2* | 2/2011 | Chuang | ................ | G02B 6/0053 |
| | | | | 362/330 |
| 8,027,086 B2* | 9/2011 | Guo | ....................... | B82Y 10/00 |
| | | | | 359/485.05 |
| 9,776,359 B2* | 10/2017 | Mizukami | ............... | B29C 53/08 |
| 9,831,362 B2* | 11/2017 | Fan | ....................... | H10F 77/707 |
| 10,268,050 B2* | 4/2019 | To | ........................... | G02C 7/022 |
| 10,345,705 B2* | 7/2019 | Kurz | .................. | G03G 15/0921 |
| 10,612,925 B2* | 4/2020 | Najafi | .................... | H03H 9/462 |
| 2006/0291064 A1* | 12/2006 | Yao | ...................... | G02B 5/0268 |
| | | | | 359/619 |
| 2009/0099308 A1* | 4/2009 | Takebe | ...................... | C08B 3/16 |
| | | | | 525/54.21 |
| 2010/0109176 A1* | 5/2010 | Davison | ............... | B29C 33/424 |
| | | | | 249/53 R |
| 2011/0151146 A1* | 6/2011 | Okano | ..................... | C08J 7/046 |
| | | | | 359/488.01 |
| 2013/0081428 A1* | 4/2013 | Liu | ..................... | C03B 23/0352 |
| | | | | 65/106 |
| 2014/0196845 A1* | 7/2014 | Yamada | ............. | B29D 99/0035 |
| | | | | 156/297 |
| 2016/0194200 A1* | 7/2016 | Najafi | ................. | C03B 23/0357 |
| | | | | 65/106 |
| 2016/0229137 A1* | 8/2016 | Burger | .................. | B29C 45/372 |
| 2019/0324293 A1* | 10/2019 | Marshall | ................ | G02C 7/022 |
| 2020/0094033 A1* | 3/2020 | De Brouwer | ..... | A61M 37/0015 |
| 2021/0069952 A1* | 3/2021 | Haut | .................. | B29D 11/0048 |

OTHER PUBLICATIONS

Huang et al. (Profile evaluation of radial Fresnel lens directly machined on rollermolds by rotating-tool diamond turning, Precision Engineering 50 (2017) 44-52) (Year: 2017).*

Kong et al. (A theoretical and experimental investigation of orthogonal slow tool servo machining of wavy micro structured patterns on precision rollers, Precision Engineering 43 (2016) 315-327) (Year: 2016).*

Zhong et al. (Microstructure formation via roll-to-roll UV embossing using a flexible mould made from a laminated polymer-copper film, J. Micromech. Microeng. 22 (2012) 085010 (12pp)) (Year: 2012).*

International Search Report in corresponding PCT Application No. PCT/EP2021/059442, mailed Jun. 16, 2021.

* cited by examiner

100

200

METHOD FOR GENERATING MICROSTRUCTURE ON A FILM BY A ROLLER

CROSS-REFERENCE TO RELATED APPLICATIONS

This application is a national phase application under 35 U.S.C. § 371 of International Application No. PCT/EP2021/059442 filed 12 Apr. 2021, which claims priority to European Patent Application No. 20315170.9 filed 14 Apr. 2020. The entire contents of each of the above-referenced disclosures is specifically incorporated by reference herein without disclaimer.

BACKGROUND

Field of the Disclosure

The present disclosure relates to method for generating a microstructure on a film by incorporating a spherical microstructure mold module design into a calendering roller.

Description of the Related Art

Large microstructure arrays have been designed for ophthalmic lens products. Ophthalmic lens products are typically comprised of a lens and a film, and the film is typically laminated on an optical surface of the lens. The optical surface of the ophthalmic lenses is usually spherical. However, when transforming microstructure arrays on the optical surface to a film surface, the microstructure arrays deform since the film is a planar surface before being applied to the lens.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to a method of designing a spherical microstructure mold module to be incorporated into a calendering roller for generating a microstructure on a film.

According to an embodiment, the present disclosure further relates to a method of designing a spherical microstructure mold module to be incorporated into a calendering roller for generating a microstructure on a planar surface, comprising calculating a first curvature on a cross-sectional planar surface for a first microstructure point of the spherical microstructure mold module, calculating a second curvature of a spherical surface of the spherical microstructure mold module, measuring a radius of the spherical surface, the radius being from the center of the spherical surface to the first microstructure point, and determining a location of the microstructure on the planar surface, the location being derived from the first curvature, the second curvature, and the radius, wherein the first curvature is between a first line and a second line on the cross-sectional planar surface, the first curvature being a longitude of the first microstructure point on the spherical microstructure mold module, the second curvature is between a third line and a fourth line on the spherical surface, the second curvature being a latitude of the first microstructure point on the spherical microstructure mold module.

According to an embodiment, the present disclosure further relates to a method of calendering one or more microstructure arrays on a film, comprising extruding a thermoplastic film between a first roller and a second roller, and embossing one or more microstructure arrays on the thermoplastic film by the second roller, the second roller having one or more individual microstructure mold modules, each microstructure mold module of the one or more individual microstructure mold modules corresponding to a microstructure array of the one or more microstructure arrays, wherein the first roller and the second roller are controlled to reach a predetermined temperature and a predetermined pressure, the first roller including a smooth cylinder, the second roller including a cylinder and the one or more individual microstructure mold modules being on the cylinder.

According to an embodiment, the present disclosure further relates to a roller structure, comprising a roller structure including a cylinder, at least one spherical microstructure mold module attached to the cylinder, and at least one microstructure mold array disposed on a spherical surface of a respective one of the at least one spherical microstructure mold module, wherein the at least one microstructure array being applied to form microstructure arrays on a thermoplastic film contacting the roller structure, wherein the spherical microstructure mold module includes one or more microstructure molds, and the microstructure arrays are designed to be disposed on a spherical ophthalmic lens surface.

According to an embodiment, the present disclosure further relates to a film for disposing microstructures on an optical film of an ophthalmic lens, comprising one or more microstructure arrays on the optical film, the one or more microstructure arrays on the optical film being formed by a roller, wherein the roller includes one or more individual microstructure mold modules, each of the one or more individual microstructure mold modules corresponding to a respective one of the one or more microstructure arrays on the optical film, and wherein a location of each microstructure in the one or more microstructure arrays is determined based on curvatures and a radius of the optical film of the ophthalmic lens.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
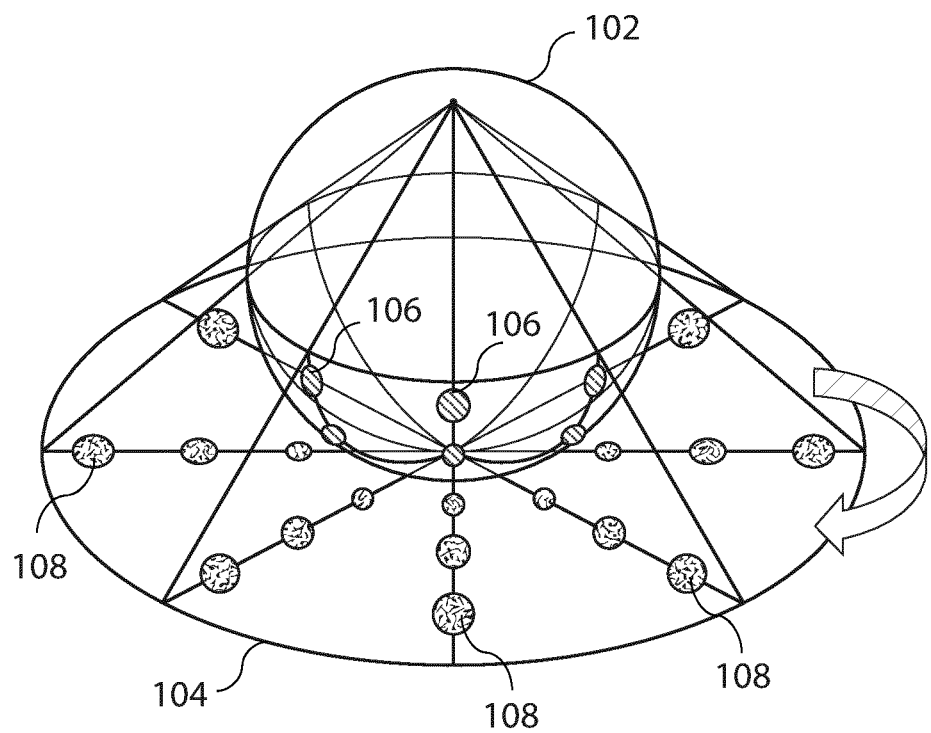
FIG. 1 is an illustration of a method of transforming microstructure array from a spherical surface to a planar surface, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The terms "about" and "approximately" are defined as being close to as understood by one of ordinary skill in the art.

The process of the present disclosure can "comprise," "consist essentially of," or "consist of" particular ingredients, components, compositions, etc., disclosed throughout the specification.

According to an embodiment, the present disclosure describes a method of transforming microstructure array designed for a spherical surface, e.g., an ophthalmic surface, with different optical designs, to a planar surface, e.g., a calendering roller surface. For instance, this method can be used to transform the microstructure array design from the ophthalmic surface to the calendering roller surface. Accordingly, the time and cost associated with designing microstructure arrays specifically for the spherical surface or the planar surface can be reduced.

According to an embodiment, the present disclosure describes a method of designing a spherical microstructure mold module to be incorporated into a calendering roller for generating a microstructure on a planar surface. For instance, the method of designing a spherical microstructure mold module can be used for efficiently embossing microstructures on films with spherical surfaces by calendering rollers.

According to an embodiment, the present disclosure describes a method of calendering one or more microstructure arrays on a film. For instance, the method of calendering the one or more microstructure arrays on a film can be used for calendering microstructure arrays on an optical film of an ophthalmic lens with different optics and dimension, e.g., spherical and cylinder powers, e.g., single vision or progressive vision, aspherical or spherical, or other lens diameters.

According to an embodiment, the present disclosure describes a method of designing a calendering roller sleeve which is made of individual interchangeable modules with one or more microstructure design. Each single module can be assembled or removed, without affecting other modules. Accordingly, the time and cost associated with producing ophthalmic lenses with different microstructures, different optics, different dimension, can be reduced.

Turning now to the figures, a schematic illustration of transforming microstructure arrays from a spherical surface, e.g., an ophthalmic surface on an ophthalmic lens with different optical designs, to a planar surface, e.g., a calendering roller surface, will now be described with reference to FIG. 1. The material of the ophthalmic lens may be polycarbonate (PC), polymethyl methacrylate (PMMA), polystyrene, polystyrene maleic anhydride, polyamide, thermoplastic urethane, thermoset polyurethane, polyester, copolyesters, polysulfone, cyclic olefin copolymers (OCO), polyphenyl oxide, allyl diglycol carbonate, polythiourethane, episulfur polymers, epoxy, poly(meth)acrylates, polythiomethacrylates, or combinations thereof. The material of the calendering roller surface may be thermoplastic materials, glass, metal, or combinations thereof. The material of the calendering roller surface may have materials with softening temperature and/or glass-transition temperature between 60° C. and 240° C.

According to an embodiment, the schematic illustration 100 depicts transforming the design of a microstructure array 106 on a spherical surface 102 to microstructure array 108 on a planar surface 104. The microstructure array 106 is represented by all of the open circles on the spherical surface 102. The microstructure array 106 may be a specific microstructure array design for a spherical surface 102 which will later be transformed to microstructure array 108 on the planar surface 104. The microstructure array 108 is represented by all of the dotted circles on the planar surface 104.

According to an embodiment, the microstructure array may include optical microstructures such as microgrooves, microprisms, microlenses, Fresnel microstructures array, diffractive structures, micro lens array, moth eye microstructure array, and the like. The microstructure array may have different shapes in the microstructure array, e.g., squares, circles, ellipses, triangles, or a combination thereof. The microstructure array may have one or more variables for the microstructure array, e.g., length, width, pitch, duty cycle of the microstructure array, etc. The microstructures may be disposed on surfaces of films and which are typically on the order of a hundredth of a millimeter in diameter to about 2 millimeter in diameter (0.01 mm to 2 mm), and about 1 micron in height but may be between 0.01 μm and 100 μm in height.

In an embodiment, the spherical surface 102 may be a surface of an ophthalmic lens. The ophthalmic lens may contain film structures on the surface, e.g., a single-layer film structure, a multi-layer film structure, laminate, or a combination thereof. Accordingly, specific microstructure arrays may be designed only on specific film structures on the ophthalmic lens and may or may not be interchangeable.

According to an embodiment, the film structure may be a single-layer film structure comprising a photochromic dye, a blue light cut dye, a UV cut dye, an IR cut dye, or any other functional constituent.

According to an embodiment, the film structure may be a multi-layer film structure including at least one layer comprising a photochromic dye, a blue light cut dye, a UV cut dye, an IR cut dye, or any other functional constituent.

In an embodiment, the microstructures on the microstructure array 106 may be transformed from the spherical surface 102 to the planar surface 104 based on one or more parameters, e.g., radius, curvatures, locations, etc. The transformation will be described in more detail with reference to FIG. 2.

Figure 2:
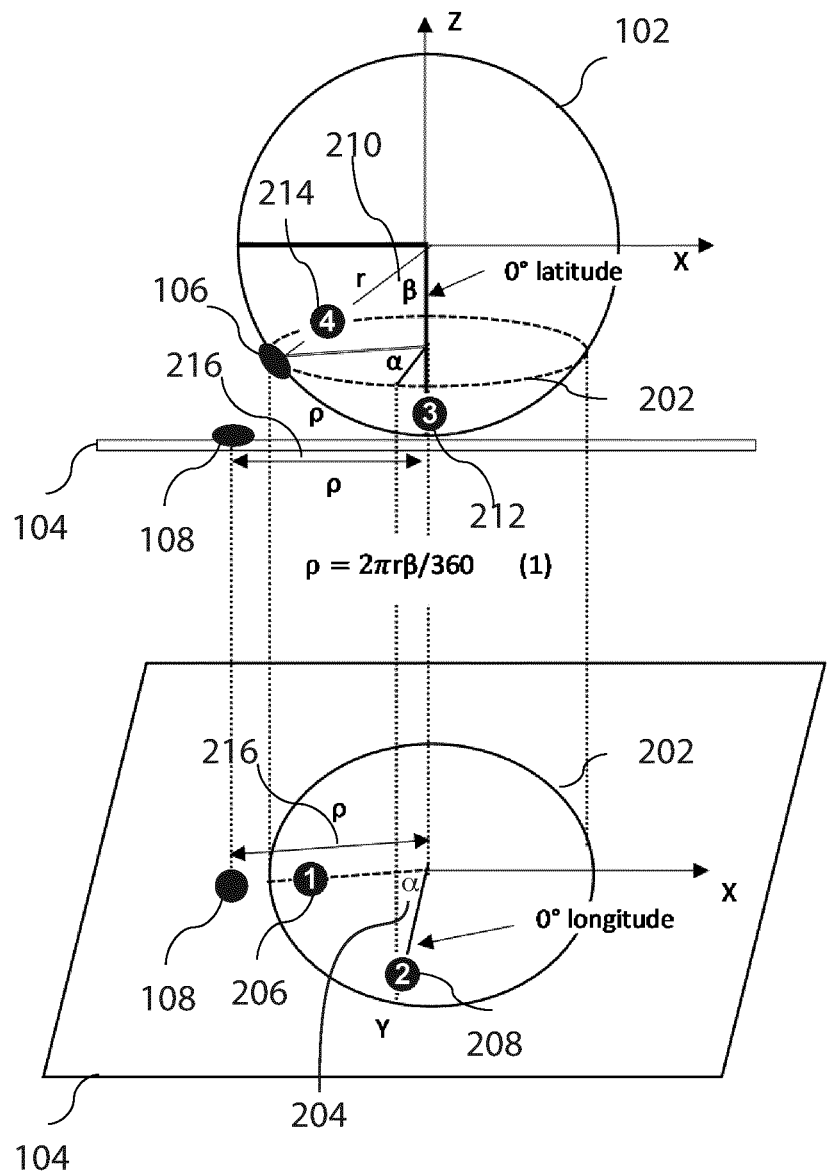
FIG. 2 is an illustration of calculating a location of microstructure array on a planar surface corresponding to a location of microstructure array on a spherical surface, according to an exemplary embodiment of the present disclosure.

In an embodiment, and with reference to FIG. 2, transforming microstructures in a microstructure array from a spherical surface 102 to a planar surface 202 in FIG. 2 may be achieved as is illustrated in the schematic illustration 200. For instance, a location of a microstructure point of the microstructure array 106 on the spherical surface 102, which corresponds to a location of the microstructure point of the microstructure array 108 on the planar surface 104, may be calculated using the various parameters in FIG. 2. The parameters are described in more detail in the following paragraphs.

According to an embodiment, with reference to FIG. 2, the spherical surface 102 and the planar surface 104 are illustrated in FIG. 2. A cross-sectional planar surface 202 is also illustrated in FIG. 2. In an embodiment, the cross-sectional planar surface 202 may be on a same surface as the microstructure point of the microstructure array 106. The cross-sectional planar surface 202 may be parallel to the planar surface 104. The cross-sectional planar surface 202 may be perpendicular to the line 212, e.g., line 3 in FIG. 2. Line 212 may be defined as zero degree latitude, e.g., 0 degree, of the spherical surface 102.

According to an embodiment, a first curvature 204 in FIG. 2, e.g., a first angle α, may be calculated between lines 206 and 208 on the cross-sectional planar surface 202. The line 206, e.g., line 1 in FIG. 2, may be a projection line of a radius, e.g., line 214, of the spherical surface 102 in FIG. 2. The projection line 206 may be on the cross-sectional planar surface 202. In an embodiment, the first curvature may be a longitude of microstructure point of the microstructure array 106 on the spherical surface 102. The line 208, e.g., line 2 in FIG. 2, may be extended from a center of the cross-sectional planar surface 202 to an edge of the cross-sectional planar surface 202. In an embodiment, the line 208 may be defined as zero degree longitude, e.g., 0 degree longitude, on the spherical surface 102.

According to an embodiment, a second curvature 210 in FIG. 2, e.g., a second angle β, may be calculated between lines 212 and 214. The line 212, e.g., line 3 in FIG. 2, may be extended from a center of the spherical surface 102 to an edge of the spherical surface 102. The edge of the spherical surface on the line 212 may be also on the planar surface 104. The line 212 may be in contact with the planar surface 104. The line 212 may be extended from a center of the spherical surface 102 to a bottom of the spherical surface 102 and the bottom of the spherical surface 102 may be on the planar surface 104. The line 212 may be perpendicular to the planar surface 104. In an embodiment, the line 212 may be defined as zero degree latitude, e.g., 0 degree latitude, of the spherical surface 102. The second curvature 210 may be calculated as a latitude of the microstructure point of the microstructure array 106 on the spherical surface 102.

According to an embodiment, the line 214 may be a radius, e.g., r in FIG. 2, of the spherical surface 102. The line 214, e.g., line 4 in FIG. 2, may be extended from a center of the spherical surface 102 to the microstructure point of the microstructure array 106. In an embodiment, the radius r of the spherical surface 102 may be between 50 mm to 800 mm.

According to an embodiment, after calculating the location of the microstructure point of the microstructure array 106 on the spherical surface 102 corresponding to the location, e.g., ρ in FIG. 2, of the microstructure point of the microstructure array 108 on the planar surface 104 by the parameters described above, e.g., the first curvature 204, the second curvature 210, and the radius 214. In an embodiment, the location of the microstructure point of the microstructure array 108 can be described as (α, ρ). The location of the microstructure point of the microstructure array 108 on the planar surface 104 can be defined by the first curvature α and length ρ, e.g., 216, can be calculated by the equation 1 as below.

$$\rho = 2\pi r \beta / 360 \quad \text{(Eq. 1)}$$

where ρ is the length of the microstructure point of the microstructure array 108 on the planar surface 104, r is the radius 214 of the spherical surface 102, and β is the second curvature 210. In an embodiment, for instance, the location of the microstructure point of the microstructure array 108 on the planar surface 104 may have a first curvature α of 90 degree and a length ρ of 20 mm.

Figure 3:
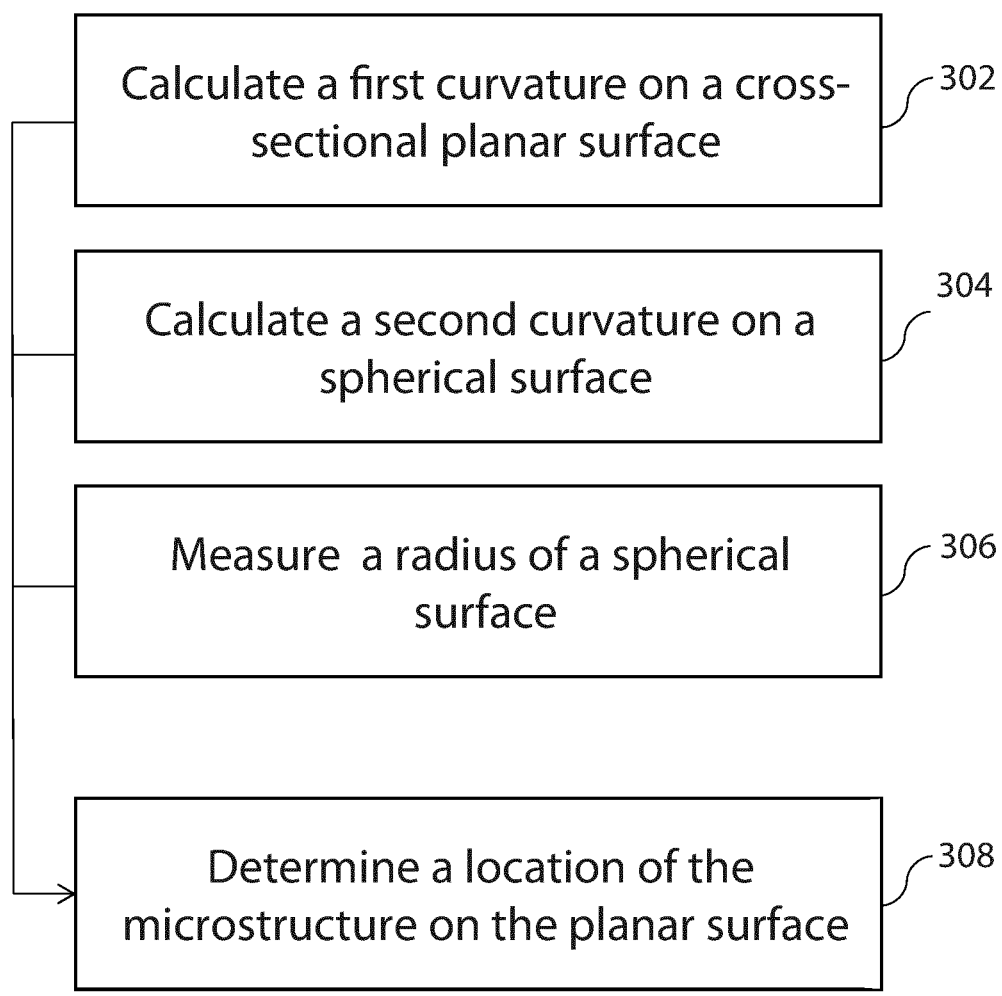
FIG. 3 is a flow diagram of designing a spherical microstructure mold module to be incorporated into a calendering roller for generating a microstructure, according to an exemplary embodiment of the present disclosure.

According to an embodiment, and with reference to FIG. 3, a method 300 is a method of designing a spherical microstructure mold module to be incorporated into a calendering roller for generating a microstructure. The method 300 may be achieved by, first, at step 302, calculating a first curvature on a cross-sectional planar surface. The first curvature 204 is described previously in FIG. 2. The first curvature 204 may be between lines 206 and 208 in FIG. 2 on the cross-sectional planar surface 202. The first curvature 204 may represent a longitude of the microstructure point of the microstructure array 106 on the spherical surface 102 in FIG. 2. In an embodiment, each microstructure of the microstructure array may correspond to each individual microstructure mold module in the microstructure mold module.

According to an embodiment, secondly, at step 304 of method 300, the method 300 is achieved by calculating a second curvature on a spherical surface. In an embodiment, the second curvature 210 may be an angle between the lines 212 and 214 in FIG. 2 on the spherical surface 102. The second curvature 210 may represent a latitude of the microstructure point of the microstructure array 106 on the spherical surface 102 in FIG. 2.

According to an embodiment, thirdly, at step 306 of method 300, the method 300 is achieved by measuring a radius of a spherical surface. In an embodiment, the radius may be the line 214, e.g., line 4 in FIG. 2. The radius of the spherical surface 102 may be in a range of 50 mm to 800 mm.

According to an embodiment, and with reference to FIG. 3, fourth, at step 308 of method 300, the method 300 is achieved by determining a location of the microstructure on the planar surface. In an embodiment, the determination of the location is achieved by using the equation 1, and parameters provided in steps 302, 304, and 306. The order of the calculations in the steps 302, 304, and 306 may not need to be the same as in FIG. 3. For instance, a second curvature may be calculated before a first curvature is calculated, or a radius of a spherical surface may be measured before the first and the second curvatures are calculated.

Figure 4A:
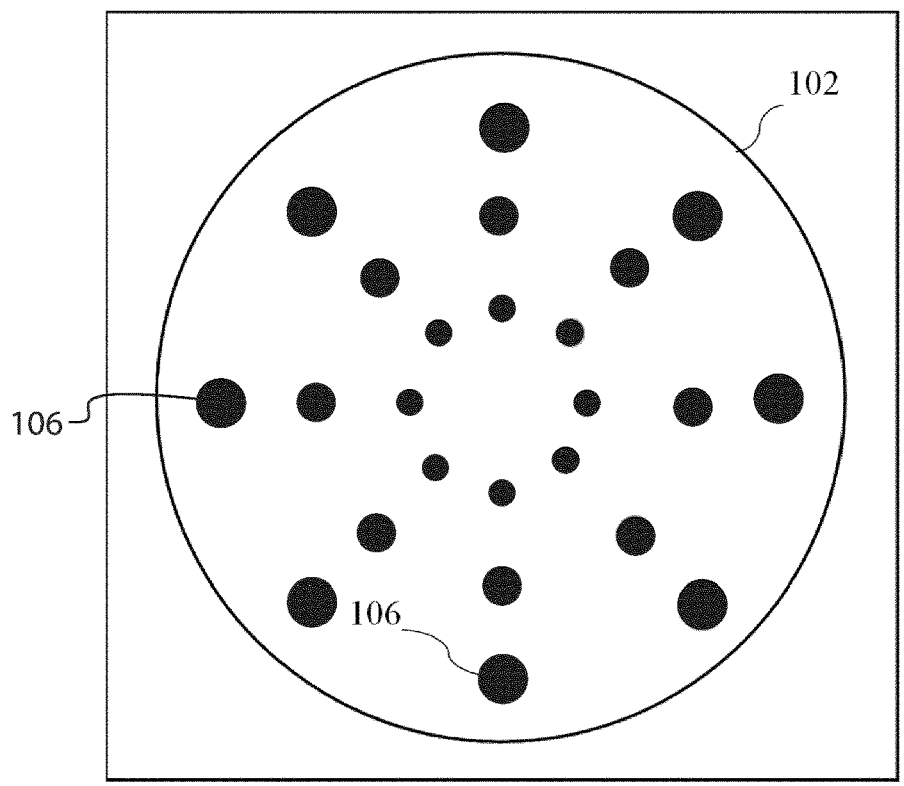
FIG. 4A is an illustration of a top view of an individual microstructure mold module with a microstructure array on a spherical surface, according to an exemplary embodiment of the present disclosure.

In an embodiment, and with reference to FIG. 4A, a top view of an individual microstructure mold module with a microstructure array on a spherical surface is illustrated. For instance, the microstructure array in the individual microstructure mold module in FIG. 4A may be the microstructure array 106 on the spherical surface 102 in FIG. 1. In an embodiment, the microstructure array in the individual microstructure mold module in FIG. 4A may be one of the microstructure mold module in the spherical microstructure mold modules.

According to an embodiment, the microstructure array 106 in the individual microstructure mold module may include optical microstructures such as microgrooves, microprisms, microlenses, Fresnel microstructures array, diffractive structures, micro lens array, moth eye microstructure array, and the like. The microstructure array may have different shapes in the microstructure array, e.g., squares, circles, ellipses, triangles, or a combination thereof. The microstructure array may have one or more variables for the microstructure array, e.g., length, width, pitch, duty cycle of the microstructure array, etc. The microstructures may be disposed on surfaces of films and may be between 0.01 mm to 2 mm in diameter and 0.01 μm and 100 μm in height.

According to an embodiment, the spherical surface 102 in FIG. 4A may be a surface of ophthalmic lens. The lens may contain a single layer film structure, a multi-layer film structure, or laminate, etc.

Figure 4B:
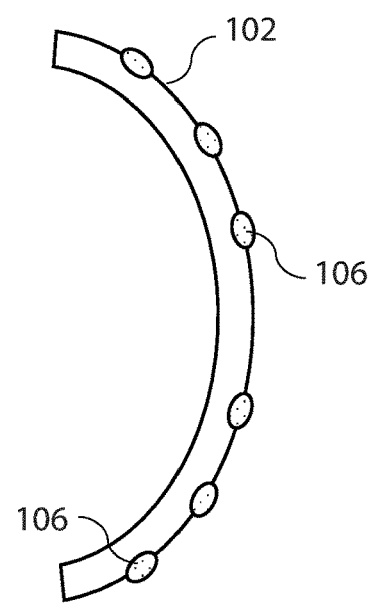
FIG. 4B is an illustration of a cross-sectional view of an individual microstructure mold module with a microstructure array on a spherical surface, according to an exemplary embodiment of the present disclosure.

In an embodiment, and with reference to FIG. 4B, a cross-sectional view of the individual microstructure mold module with a microstructure array design on the spherical surface is illustrated. The microstructure array design in FIG. 4B may be embossed on the spherical surface. The microstructure array design may include different microstructures, e.g., a square, a triangle, a circle, or a combination thereof. In an embodiment, the microstructures in the microstructure array may be between 0.01 mm to 2 mm in diameter and 0.01 μm and 100 μm in height.

Figure 5:
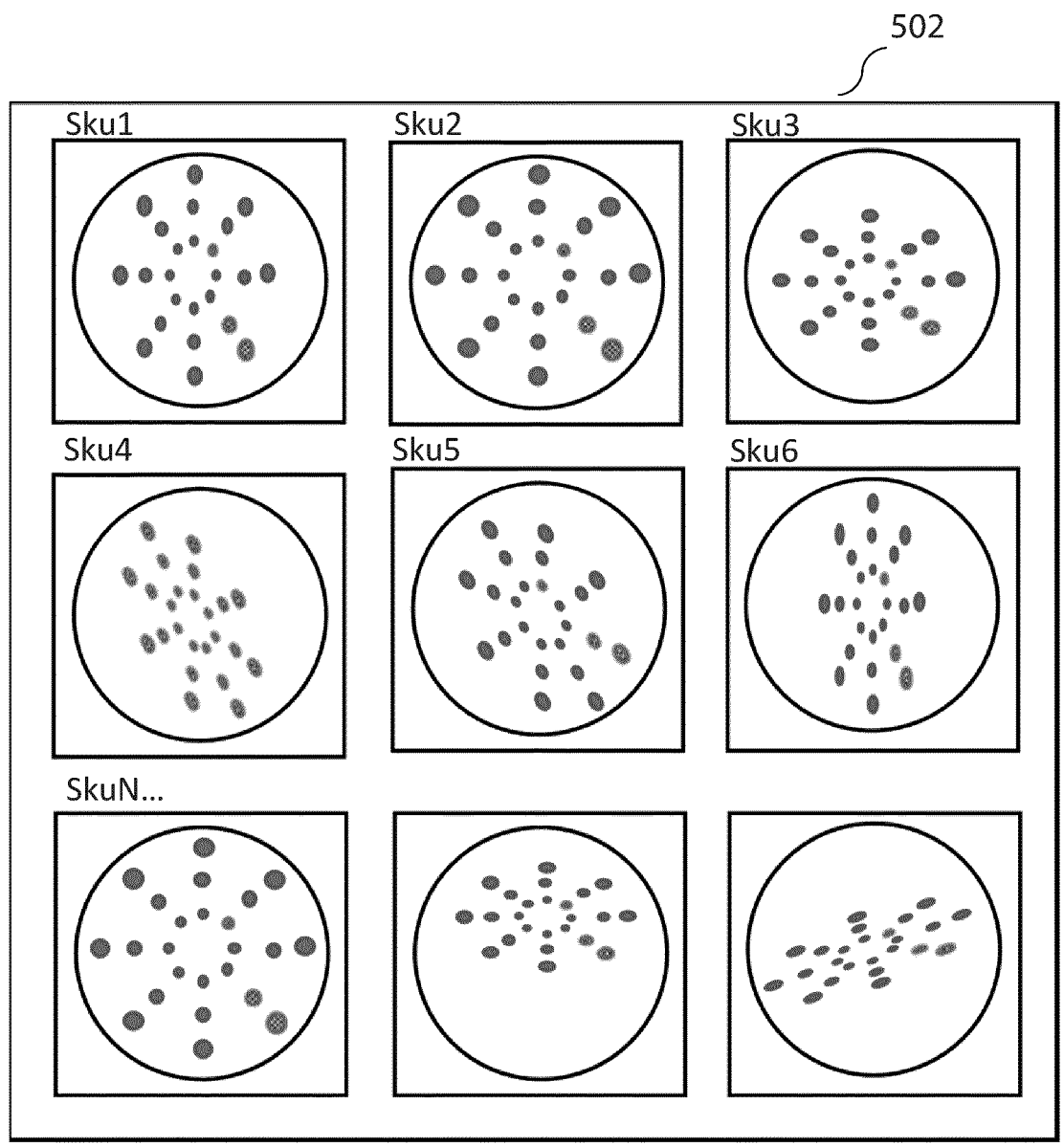
FIG. 5 is an illustration of one or more individual microstructure mold modules with different microstructure designs, according to an exemplary embodiment of the present disclosure.

In an embodiment, and with reference to FIG. 5, one or more individual microstructure mold modules with different microstructure designs are illustrated. Each optical microstructure design may correspond to a specific individual microstructure mold module in the one or more individual microstructure mold modules. The different optical designs, e.g. sku1, sku2, sku3, sku4, sku5, sku6, skuN in the individual microstructure mold modules may be disposed on a film structure 502 to create microstructure mold module arrays. In an embodiment, the microstructure mold module array may be on a spherical surface or a planar surface. In some embodiments, the film structure 502 may be a single-layer film structure comprising optical sensitive materials, rubber, plastics, or a combination thereof. In some embodiments, the film structure may be a multi-layer film structure comprising one or more films, e.g., thermoplastic films, optical films, polymer films, or a combination thereof.

Figure 6:
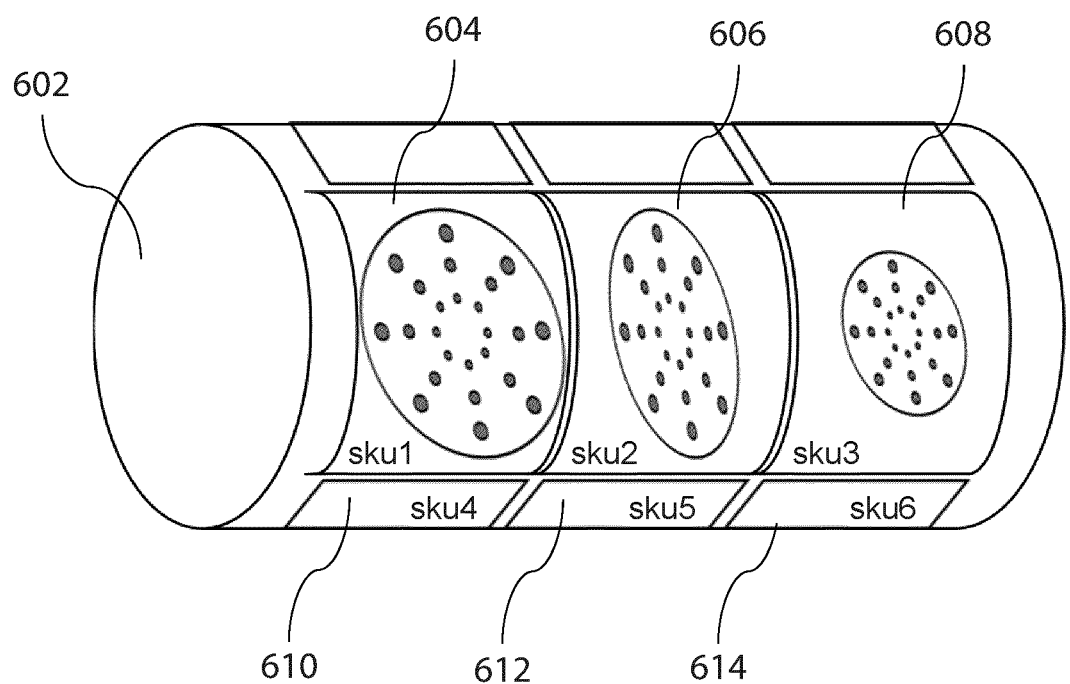
FIG. 6 is an illustration of different microstructure designs on a calendering roller, according to an exemplary embodiment of the present disclosure.

In an embodiment, and with reference to FIG. 6, different optical designs of microstructures, e.g., individual microstructure mold modules, are illustrated on the calendering roller 600. The calendering roller 600 may include a cylinder 602, and different microstructure designs in the individual microstructure mold modules, e.g., microstructure mold module 604 with optical design sku1, microstructure mold module 606 with optical design sku2, microstructure mold module 608 with optical design sku3, microstructure mold module 610 with optical design sku4, microstructure mold module 612 with optical design sku5, microstructure mold module 614 with optical design sku6, etc.

According to an embodiment, each individual microstructure mold module of the individual microstructure mold modules, e.g., individual microstructure mold modules 604, 606, 608, 610, 612, and 614, may be attached to the cylinder 602 by one or more bonding methods. For example, the method may include bonding the individual microstructure mold modules on the cylinder 602 by a physical bonding method, e.g., using high pressure or high temperature. For another example, the method may include bonding the individual microstructure mold modules on the cylinder 602 by a chemical bonding method, e.g., using materials such as epoxy, glue, etc.

According to an embodiment, the microstructure array in the individual microstructure mold module may be designed to be disposed on a spherical surface. For instance, the microstructure array may be disposed on an ophthalmic lens surface.

According to an embodiment, the cylinder 602 may have a diameter between 20 mm and 300 mm and a length of between 80 mm and 2000 mm. The cylinder 602 may be made by plastic, metal, glass, or a combination thereof.

Figure 7:
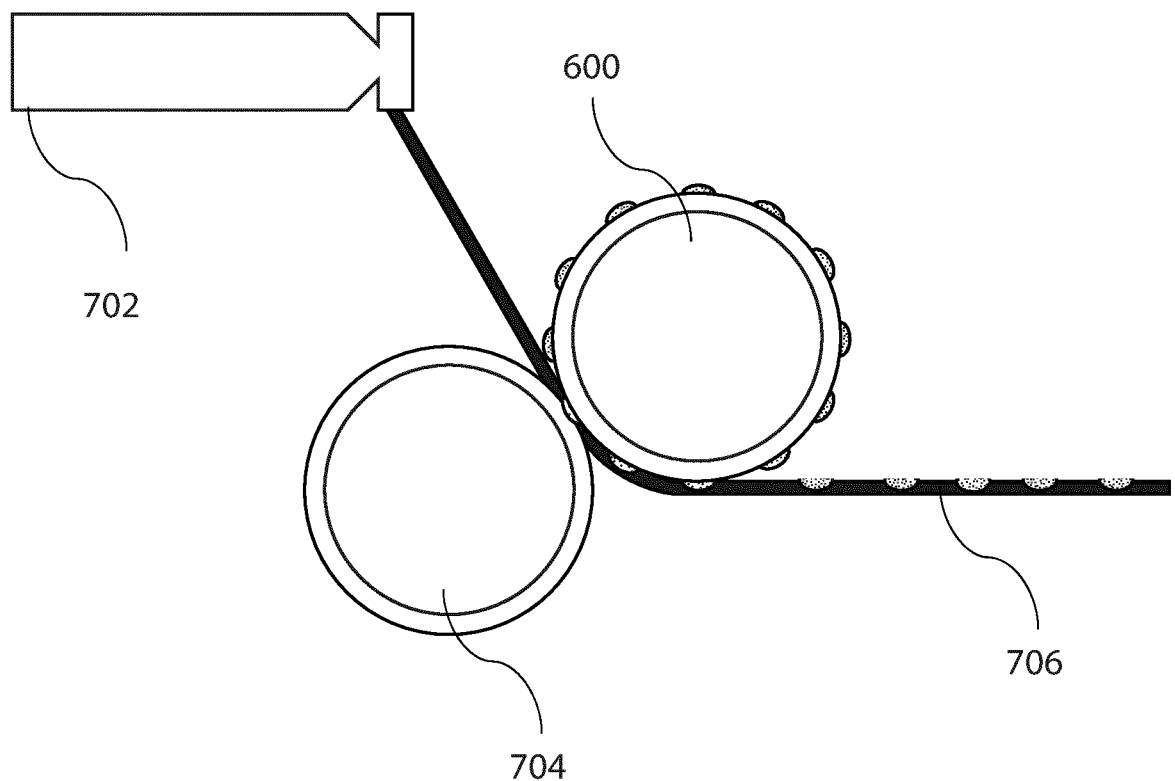
FIG. 7 is an illustration of a system of film extrusion and microstructure embossment by rollers, according to an exemplary embodiment of the present disclosure.

In an embodiment, and with reference to FIG. 7, a system 700 for film extrusion and microstructure embossment is illustrated. The system 700 includes one calendering roller 600 and one regular roller 704. The calendering roller 600 is described in details in FIG. 6. In an embodiment, the calendering roller 600 includes one or more individual microstructure mold modules 604, 606, 608, 610, 612, and 614, which are disposed on the cylinder 602 in FIG. 6.

Accordingly to an embodiment, each microstructure mold module of the one or more individual microstructure mold modules may correspond to a microstructure array of the one or more microstructure arrays to be embossed on the film 706. In addition, the microstructure array design in each microstructure mold module is different as described previously in FIG. 6, e.g., sku1, sku2, sku3, sku4, sku5, and sku6.

In some embodiments, the calendering roller 600 may be replaced by a stamp. The stamp may be used for creating microstructures on a film.

In addition, the calendering roller 600 may be integrated with an injection molding machine to create microstructure arrays on surfaces, e.g., optical surface, plastic surface, or metal surface, etc.

According to an embodiment, the system 700 may include a film extrusion machine 702. The film extrusion machine 702 may be a plastic film extrusion machine, or the like. In an embodiment, the film extrusion machine 702 may extrude a film 706 between the regular roller 704 and the calendering roller 600. The film 706 may be a thermoplastic film, optical sensitive film, or the like.

According to an embodiment, microstructure arrays on the film 706 may be embossed by the one or more individual microstructure mold modules 604, 606, 608, 610, 612, 614 using the calendering roller 600. In an embodiment, the calendering roller 600 may be applied with a temperature with a certain range, e.g., 60° C. and 240° C., before starting the process of embossing the one or more microstructure arrays on the film 706. The regular roller 704 may be applied with a temperature with a certain range, e.g., 60° C. and 240° C., before starting the process of embossing microstructure arrays on the film 706.

According to an embodiment, the regular roller 704 may be a cylinder with or without any pattern. In an embodiment, the regular roller 704 may be a cylinder with a smooth surface. The cylinder of the regular roller 704 may be made by metal, plastic, or a combination thereof.

Figure 8:
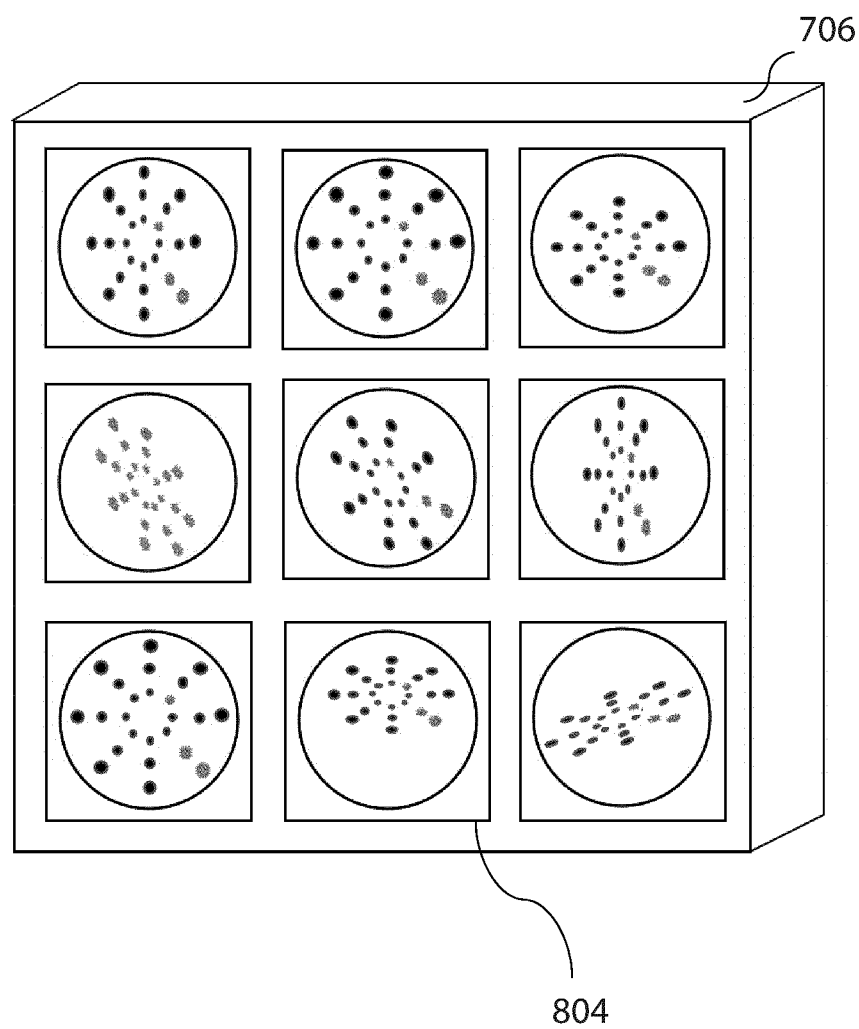
FIG. 8 is an illustration of a film with microstructure arrays after embossed by the system in FIG. 7, according to an exemplary embodiment of the present disclosure.

In an embodiment, and with reference to FIG. 8, a product 800 including microstructure arrays 804 on a film 706 is illustrated. The microstructure arrays 804 on the film 706 are embossed by one or more individual microstructure mold modules 604, 606, 608, 610, 612, 614 on the calendering roller 600. In an embodiment, the film 706 with microstructure arrays 804 with different optical designs may be used as an optical film 706 of an ophthalmic lens. Each microstructure array of the one or more microstructure arrays 804 may correspond to a respective microstructure mold module of the one or more individual microstructure mold modules 604, 606, 608, 610, 612, 614 on the optical film 706.

According to an embodiment, the product 800 may further be integrated with an ink jet printing device, a stamping device, a lamination device, or an injection molding device, on any types of surfaces, e.g., surfaces of metal devices, surfaces of plastic devices, surfaces of glass devices, etc., where the ink can be absorbed.

According to an embodiment, a location of each microstructure mold module of the one or more individual microstructure mold modules 604, 606, 608, 610, 612, 614 may be determined based on the first curvature 204, the second curvature 210, and the radius r of the surface of the optical film of the ophthalmic lens. The determination is previously described in details in the paragraphs associated with FIG. 2.

Figure 9:
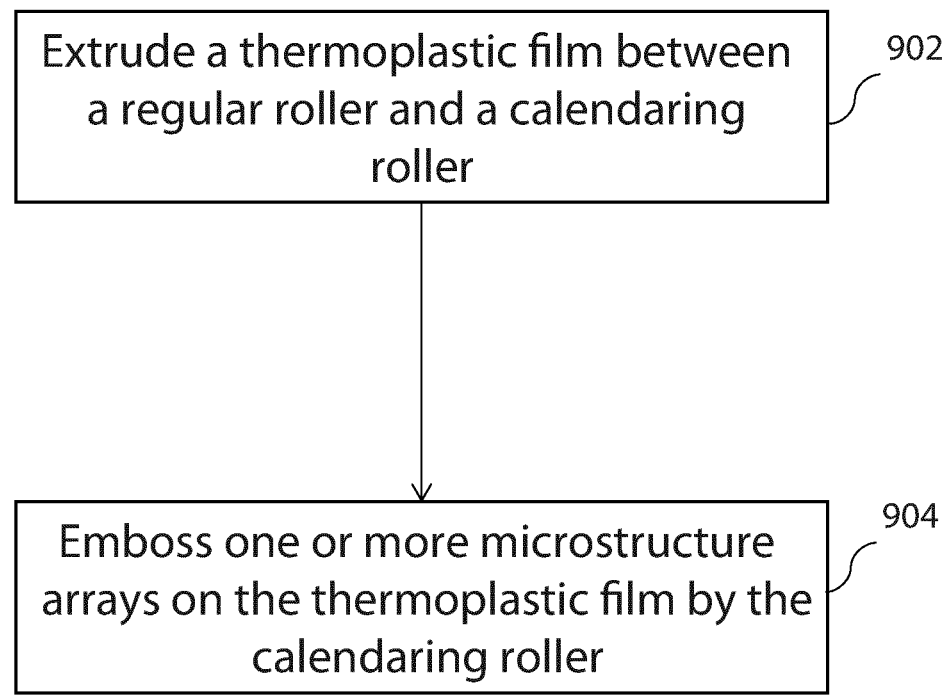
FIG. 9 is a flow diagram of a method of creating microstructure arrays on a film by rollers, according to an exemplary embodiment of the present disclosure.

In an embodiment, and with reference to FIG. 9, a method 900 of creating microstructure arrays on a film, e.g., a thermoplastic film, may be achieved by, first at step 902 of method 900, extruding a thermoplastic film between a regular roller and a calendering roller. In an embodiment, the regular roller may be the roller 704 in FIG. 7 and the calendering roller may be the roller 600 in FIG. 6 and FIG. 7.

According to an embodiment, after a thermoplastic film being extruded between rollers 704 and 600, at step 904 of the method 900, embossing one or more microstructure arrays on the thermoplastic film by the calendering roller 600. In an embodiment, the structure 700 in FIG. 7 may be used to emboss the one or more microstructure arrays on the thermoplastic film.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method of designing a spherical microstructure mold module to be incorporated into a calendering roller for generating a microstructure on a planar surface, comprising calculating a first curvature on a cross-sectional planar surface for a first microstructure point of the spherical microstructure mold module, calculating a second curvature of a spherical surface of the spherical microstructure mold module, measuring a radius of the spherical surface, the radius being from the center of the spherical surface to the first microstructure point; and determining a location of the microstructure on the planar surface, the location being derived from the first curvature, the second curvature, and the radius.

(2) The method according to (1), wherein the first curvature is between a first line and a second line on the cross-sectional planar surface, the first curvature being a longitude of the first microstructure point on the spherical microstructure mold module.

(3) The method according to (2), wherein the first line is a projection line of the radius of the spherical surface on the cross-sectional planar surface and the second line is from a center of the cross-sectional planar surface to an edge of the cross-sectional planar surface.

(4) The method according to (1), wherein the second curvature is between a third line and a fourth line on the spherical surface, the second curvature being a latitude of the first microstructure point on the spherical microstructure mold module.

(5) The method according to (4), wherein the third line is from a center of a spherical surface of the spherical microstructure mold module to a bottom of the spherical surface and the fourth line is from the center of the spherical surface to the first microstructure point, the bottom of the spherical surface being on the planar surface.

(6) The method according to (1), wherein the calendering roller includes one or more microstructure molds on the spherical microstructure mold module, each microstructure mold of the one or more microstructure molds having a different microstructure design.

(7) A method of calendering one or more microstructure arrays on a film, comprising extruding a thermoplastic film between a first roller and a second roller, and embossing one or more microstructure arrays on the thermoplastic film by the second roller, the second roller having one or more individual microstructure mold modules, each microstructure mold module of the one or more individual microstructure mold modules corresponding to a microstructure array of the one or more microstructure arrays.

(8) The method according to (7), wherein the first roller and the second roller are controlled to reach a predetermined temperature, the first roller including a smooth cylinder, the second roller including a cylinder and the one or more individual microstructure mold modules being on the cylinder.

(9) The method according to (7), wherein each microstructure mold module of the one or more individual microstructure mold modules has a different microstructure design.

(10) The method according to (9), wherein each microstructure design corresponding to each microstructure mold module is determined based on curvatures and a radius of the microstructure array on the film.

(11) A roller structure, comprising a roller structure including a cylinder, at least one spherical microstructure mold module attached to the cylinder, and at least one microstructure mold array disposed on a spherical surface of a respective one of the at least one spherical microstructure mold module, wherein the at least one microstructure array being applied to form microstructure arrays on a thermoplastic film contacting the roller structure.

(12) The roller structure according to (11), wherein the spherical microstructure mold module includes one or more microstructure molds.

(13) The roller structure according to (11), wherein the microstructure arrays are designed to be disposed on a spherical ophthalmic lens surface.

(14) A film for disposing microstructures on an optical film of an ophthalmic lens, comprising one or more microstructure arrays on the optical film, the one or more microstructure arrays on the optical film being formed by a roller, wherein the roller includes one or more individual microstructure mold modules, each of the one or more individual microstructure mold modules corresponding to a respective one of the one or more microstructure arrays on the optical film.

(15) The film according to (14), wherein a location of each microstructure in the one or more microstructure arrays is determined based on curvatures and a radius of the optical film of the ophthalmic lens.

(16) A method of molding one or more microstructure arrays on a film, comprising extruding a thermoplastic film to a first device, and embossing one or more microstructure arrays on the thermoplastic film by a second device, the second device having one or more individual microstructure mold modules, each microstructure mold module of the one or more individual microstructure mold modules corresponding to a microstructure array of the one or more microstructure arrays.

(17) The method according to (16), wherein the first device is a molding device and the second device is a roller, the molding device having a planar surface and the roller including a cylinder and the one or more individual microstructure mold modules being on the cylinder.

(18) The method according to (16), wherein the first device is a stamping device and the second device is a metal stamp, surfaces of the stamping device and the metal stamp being planar.

(19) The method according to (16), further comprising using the stamping device to dispose the one or more microstructure arrays on an optical film of an ophthalmic lens.

By providing the features of the disclosure, it is possible to manufacture microstructures (e.g. microlenses) without creating expensive custom rollers having a number of fixed designs. The swappable mold modules, designed keeping in mind the shape of the roller and the eventual shape of the lens, can be easily replaced when a new design or lens shape is imagined or implemented. This customizable nature of the mold modules improves the manufacturing process by allowing faster updates, corrections, and repairs of the roller as only one, or a few, of the mold modules on the roller need to be replaced leaving the majority of the roller intact. This is in contrast to prior systems, which would require that the whole roller be replaced when even one of the molds needed modification or repair.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of manufacturing a spherical microstructure mold module to be incorporated into a calendering roller for manufacturing a microstructure on a planar surface, comprising:
    a) determining a location of the microstructure on the planar surface by:
        i) calculating a first curvature on a cross-sectional planar surface for a first microstructure point of the spherical microstructure mold module;
        ii) calculating a second curvature of a spherical surface of the spherical microstructure mold module; and
        iii) measuring a radius of the spherical surface, the radius being from the center of the spherical surface to the first microstructure point;
    wherein said location is derived from the first curvature, the second curvature, and the radius; and
    b) manufacturing the spherical microstructure mold module, wherein the manufacturing is based on the location of the microstructure.

2. The method according to claim 1, wherein the first curvature is between a first line and a second line on the cross-sectional planar surface, the first curvature being a longitude of the first microstructure point on the spherical microstructure mold module.

3. The method according to claim 2, wherein the first line is a projection line of the radius of the spherical surface on the cross-sectional planar surface and the second line-is from a center of the cross-sectional planar surface to an edge of the cross-sectional planar surface.

4. The method according to claim 1, wherein the second curvature is between a third line and a fourth line on the spherical surface, the second curvature being a latitude of the first microstructure point on the spherical microstructure mold module.

5. The method according to claim 4, wherein the third line is from a center of a spherical surface of the spherical microstructure mold module to a bottom of the spherical surface and the fourth line is from the center of the spherical surface to the first microstructure point, the bottom of the spherical surface being on the planar surface.

6. The method according to claim 1, wherein the calendering roller includes one or more microstructure molds on the spherical microstructure mold module, each microstructure mold of the one or more microstructure molds having a different microstructure design.

7. A method of manufacturing a spherical microstructure mold module to be incorporated into a calendering roller for manufacturing a microstructure on a planar surface, comprising:
    a) determining a location of the microstructure on the planar surface by:
        i) calculating a first curvature on a cross-sectional planar surface for a first microstructure point of the spherical microstructure mold module;
        ii) calculating a second curvature of a spherical surface of the spherical microstructure mold module; u
        iii) measuring a radius of the spherical surface, the radius being from the center of the spherical surface to the first microstructure point;
    said location being derived from the first curvature, the second curvature, and the radius;
    wherein the first curvature is between a first line and a second line on the cross-sectional planar surface, the first curvature being a longitude of the first microstructure point on the spherical microstructure mold module; and b) manufacturing the spherical microstructure mold module, wherein the manufacturing is based on the determined location of the microstructure.

\* \* \* \* \*